US007628627B2

(12) United States Patent
Lee et al.

(10) Patent No.: US 7,628,627 B2
(45) Date of Patent: Dec. 8, 2009

(54) BACKLIGHT CONNECTOR

(75) Inventors: Chul-Sub Lee, Daegu (KR); Byoung-Wook Kang, Daegu (KR); Oh-Hyeon Kwon, Daegu (KR)

(73) Assignee: Tyco Electronics AMP Korea Ltd., Kyungsangbuk-Do (KR)

( * ) Notice: Subject to any disclaimer, the term of this patent is extended or adjusted under 35 U.S.C. 154(b) by 208 days.

(21) Appl. No.: 11/851,061

(22) Filed: Sep. 6, 2007

(65) Prior Publication Data

US 2008/0062350 A1 Mar. 13, 2008

(30) Foreign Application Priority Data

Sep. 7, 2006 (KR) ...................... 10-2006-0086342

(51) Int. Cl.
*H01R 33/02* (2006.01)
*G02F 1/1335* (2006.01)

(52) U.S. Cl. ....................... 439/232; 439/233; 439/239; 362/217.01; 362/376; 362/396; 362/97.1; 362/634; 349/61

(58) Field of Classification Search ................. 439/232, 439/233, 239; 362/97.1, 217.01, 376, 396, 362/634; 349/58, 61
See application file for complete search history.

(56) References Cited

U.S. PATENT DOCUMENTS

| | | | | |
|---|---|---|---|---|
| 5,886,758 | A * | 3/1999 | Ibaraki | 349/58 |
| 7,530,829 | B2 * | 5/2009 | Yuan et al. | 439/232 |
| 7,540,750 | B2 * | 6/2009 | Miyazono | 439/226 |

* cited by examiner

*Primary Examiner*—Stephen F Husar
*Assistant Examiner*—James W Cranson
(74) *Attorney, Agent, or Firm*—Barley Snyder LLC

(57) ABSTRACT

A backlight connector includes a housing having a backlight lamp receiving opening with an inclined guide groove and a cover having a terminal insertion member and an inclined surface corresponding to the inclined guide groove. The inclined surface and the terminal insertion member extending into the backlight lamp receiving opening when the cover is moved from an uppermost position to a lowermost position along the inclined guide groove.

13 Claims, 9 Drawing Sheets

BACKLIGHT CONNECTOR

CROSS-REFERENCE TO RELATED APPLICATIONS

This application claims the benefit of the filing date under 35 U.S.C. § 119(a)-(d) of Korean Patent Application No. 10-2006-0086342, filed Sep. 7, 2006.

FIELD OF THE INVENTION

The present invention relates to a backlight connector mounted, for example, to a liquid crystal display (LCD) panel, and, more particularly, to a backlight connector wherein when a cover of the backlight connector, in which a backlight lamp is inserted, is pushed substantially vertically downward, an electrical connection between a connection terminal of the backlight lamp and a terminal of the backlight connector is accomplished, whereby the backlight lamp is fixed to the backlight connector.

BACKGROUND

LCDs are used in various kinds of display devices. The LCD has advantages in that the LCD has a thickness small enough to be hung on a wall, and, in addition, the LCD can be manufactured into various sizes from a small-sized display device to a large-sized display device. Therefore, the LCD is being widely utilized in various products, such as computer monitors and televisions, including small-sized electronic products, such as mobile phones and portable multimedia players (PMPs). In the LCD, however, pixels constituting a picture do not perform a light emitting function. For this reason, a backlight unit is coupled to a rear of an LCD panel for the purpose of displaying a bright and vivid picture. In the backlight unit are mounted a plurality of lamps, which emit light such that the LCD can be brightly and vividly displayed.

To solve the above-mentioned problem, a backlight connector has been developed, which is disclosed in Korean Patent Application No. 10-2006-75246 and was filed in the name of the applicant of the subject patent application. Hereinafter, the construction and operation of this backlight connector will be described in detail with reference to FIG. 6.

As shown in FIG. 6, the backlight connector includes a terminal 100 made of an electrically conductive material. The terminal 100 is provided at one side thereof with a fixing member 101, which is fixed to a circuit board (not shown) by soldering. The terminal 100 is provided at the other side thereof with a connection groove, in which a connection terminal 2 of a backlight lamp 1 is fixedly inserted. The backlight connector further includes a housing 200 for surrounding an outside of the terminal 100. The housing 200 has a backlight lamp receiving opening 201 defined therein. The backlight lamp receiving opening 201 is open at a top thereof. The housing 200 supports a corresponding end of the backlight lamp 1. The backlight connector further includes a cover 400 coupled to the housing 200 in such a manner that the cover 400 can be moved upward and downward. The cover 400 is open at a top thereof such that the end of the backlight lamp 1 is inserted into the cover 400. The backlight connector further includes a clip 300 coupled to the inside of the cover 400 in such a manner that the clip 300 can be moved upward and downward. When the cover 400 is moved downward and is coupled to the inside of the housing 200, the clip 300 forcibly inserts the connection terminal 2 of the backlight lamp 1 into the inside of the terminal 100.

Consequently, when the backlight lamp 1 is located at the top of the backlight connector, and then the cover 400 is pushed vertically downward, the clip 300 narrows, and, at the same time, the clip 300 is moved downward while the clip 300 is in tight contact with the connection terminal 2 of the backlight lamp 1. As a result, the connection terminal 2 of the backlight lamp 1 is moved downward and is forcibly inserted into the inside of the terminal 100. Therefore, it is possible to automatically couple the backlight lamp 1 to the backlight connector through the use of a simple pushing apparatus.

However, the number of components constituting the conventional backlight connector is large, and the structure of the backlight connector is very complex. Consequently, it is difficult to manufacture the backlight connector, and the assembly process of the backlight connector is very complicated and troublesome. Furthermore, when the clip 300 widens, during the coupling of the backlight lamp 1 to the backlight connector, the clip 300 is not brought into tight contact with the connection terminal 2 of the backlight lamp 1, with the result that a force necessary to forcibly insert the connection terminal 2 of the backlight lamp 1 is decreased.

SUMMARY

It is therefore an object of the present invention to provide a backlight connector that has a minimum number of components wherein a backlight lamp is automatically coupled to the backlight connector by an upward and downward movement of a cover of the backlight connector.

It is another object of the present invention to provide a backlight connector wherein a housing of the backlight connector stably supports a backlight lamp, and a cover of the backlight connector can be smoothly moved at the inside of the housing in an inclined fashion.

It is another object of the present invention to provide a backlight connector wherein a backlight lamp is easily and conveniently inserted into the inside of the backlight connector and the connection between a terminal of the backlight connector and a connection terminal of the backlight lamp is accomplished by the downward movement of a cover of the backlight connector.

It is another object of the present invention to provide a backlight connector wherein a force applied to a connection terminal of a backlight lamp by a pushing protrusion is dispersed.

It is another object of the present invention to provide a backlight connector wherein a cover of the backlight connector is prevented from being separated from a housing of the backlight connector, after a backlight lamp is completely coupled to the backlight connector.

It is another object of the present invention to provide a backlight connector wherein a cover of the backlight connector, locked to a housing of the backlight connector, is easily separated from the housing.

It is a further object of the present invention to provide a backlight connector wherein the separation of a cover of the backlight connector from a housing of the backlight connector is prevented before a backlight lamp is fixed to the backlight connector.

These and other objects are achieved by a backlight connector comprising a housing having a backlight lamp receiving opening with an inclined guide groove and a cover having a terminal insertion member and an inclined surface corresponding to the inclined guide groove. The inclined surface and the terminal insertion member extending into the backlight lamp receiving opening when the cover is moved from an uppermost position to a lowermost position along the inclined guide groove.

DETAILED DESCRIPTION OF THE DRAWINGS

Figure 1:
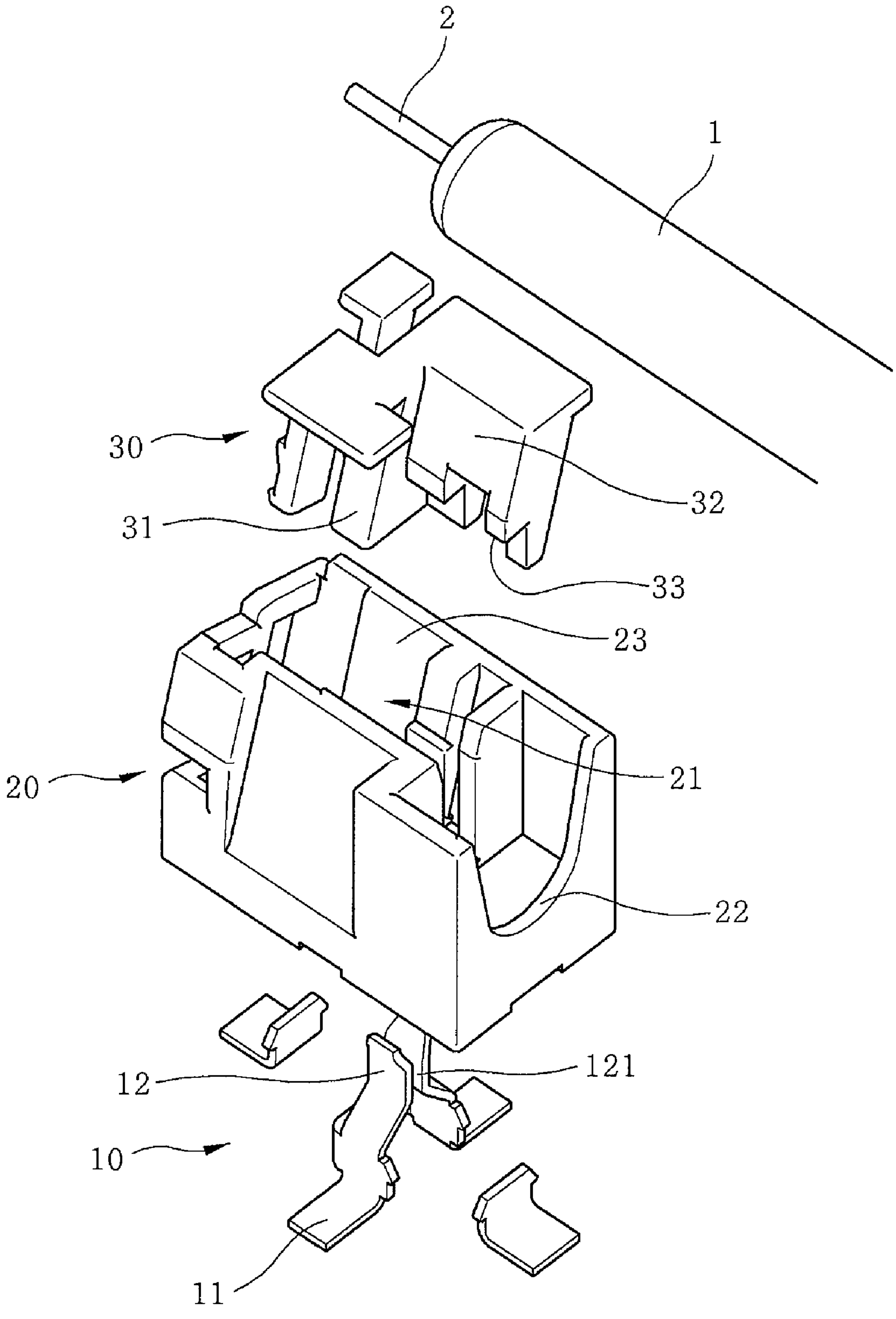
FIG. 1 is an exploded perspective view of a backlight connector according to an embodiment of the present invention.
Figure 3A:
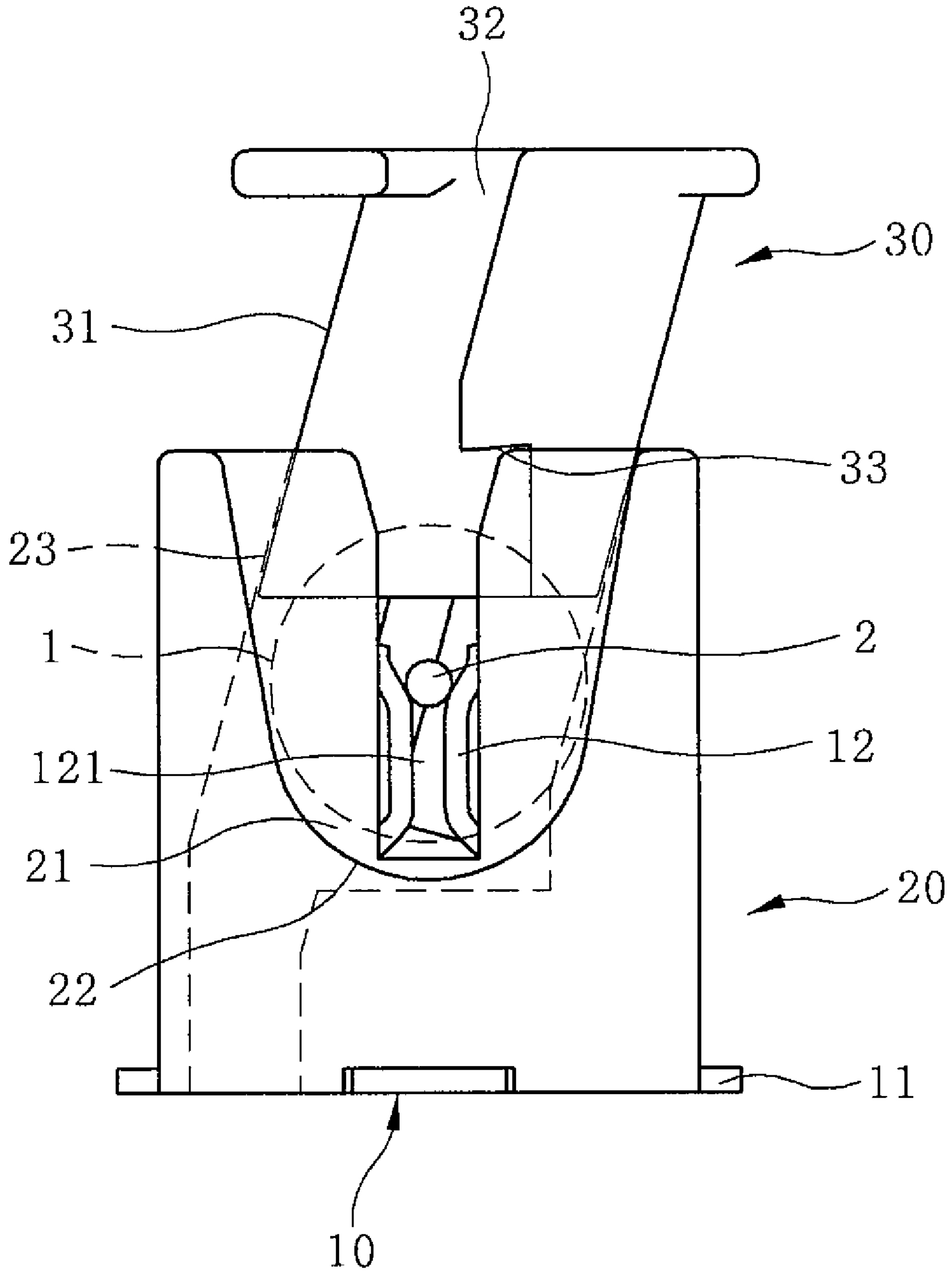
Figure 3B:
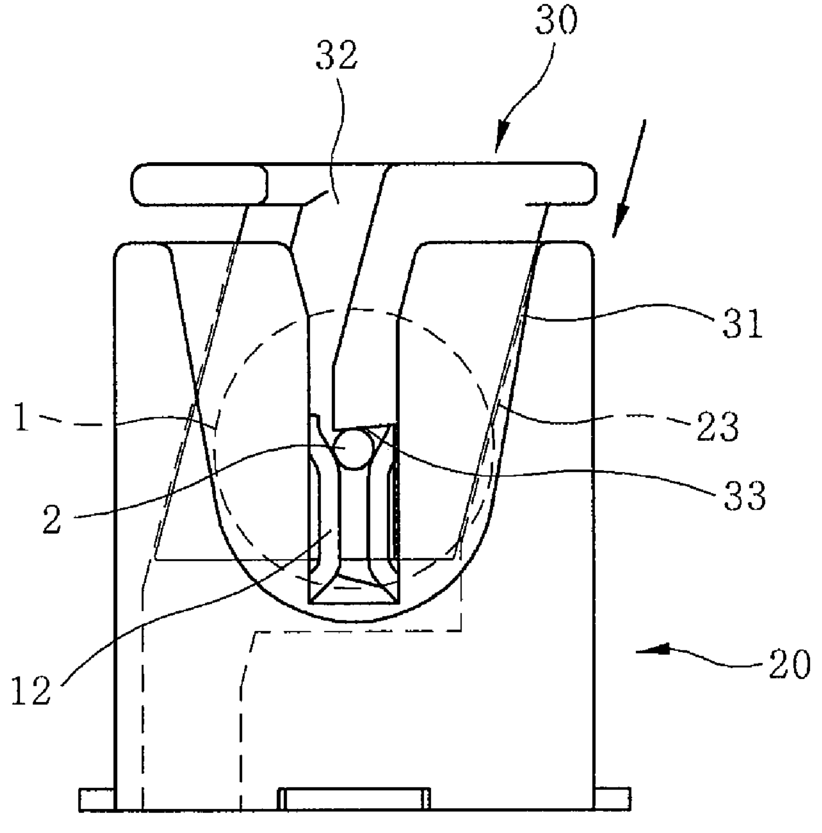
Figure 3C:
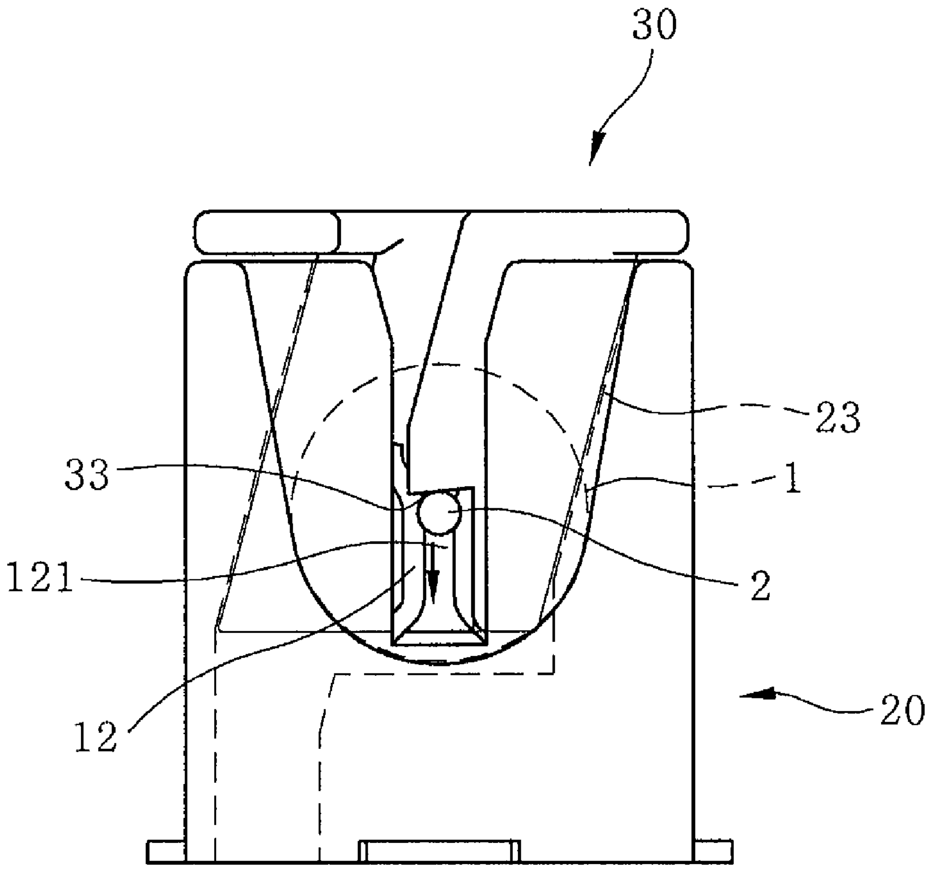
Figure 4:
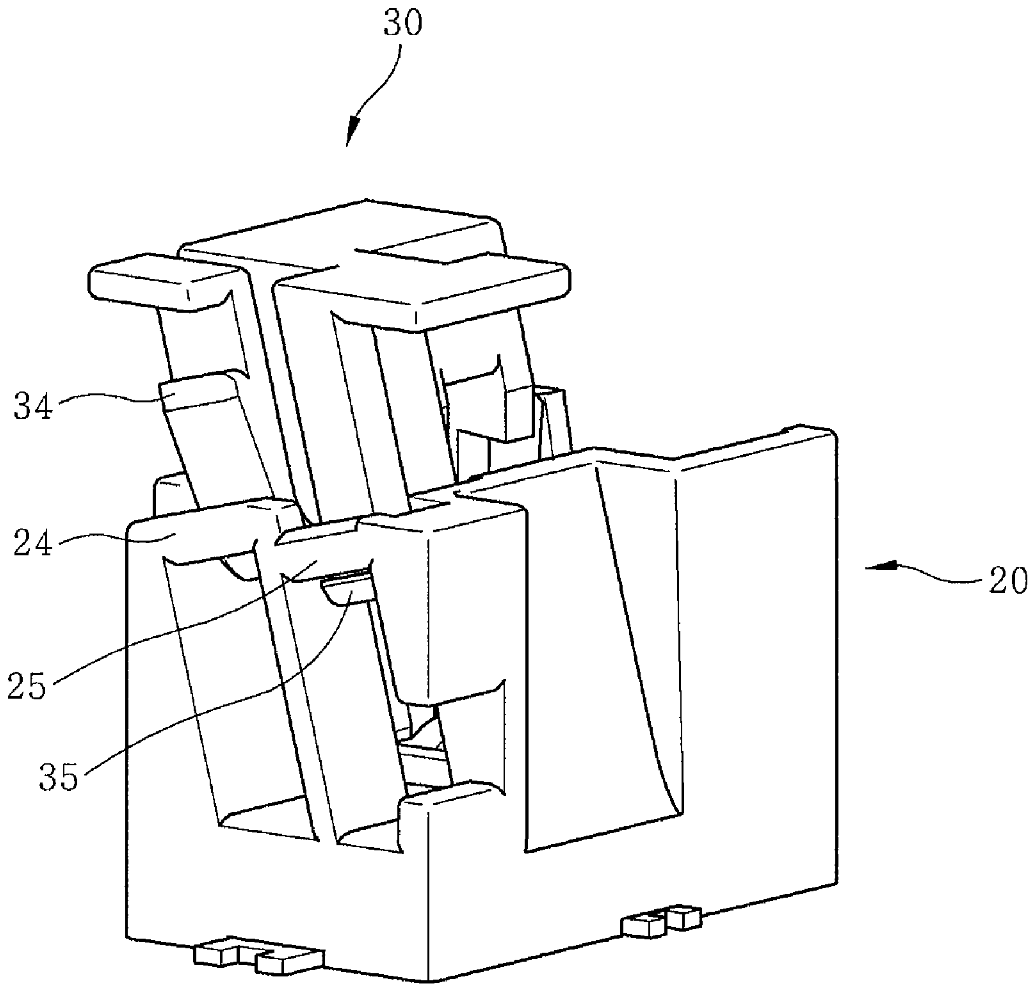
Figure 5A:
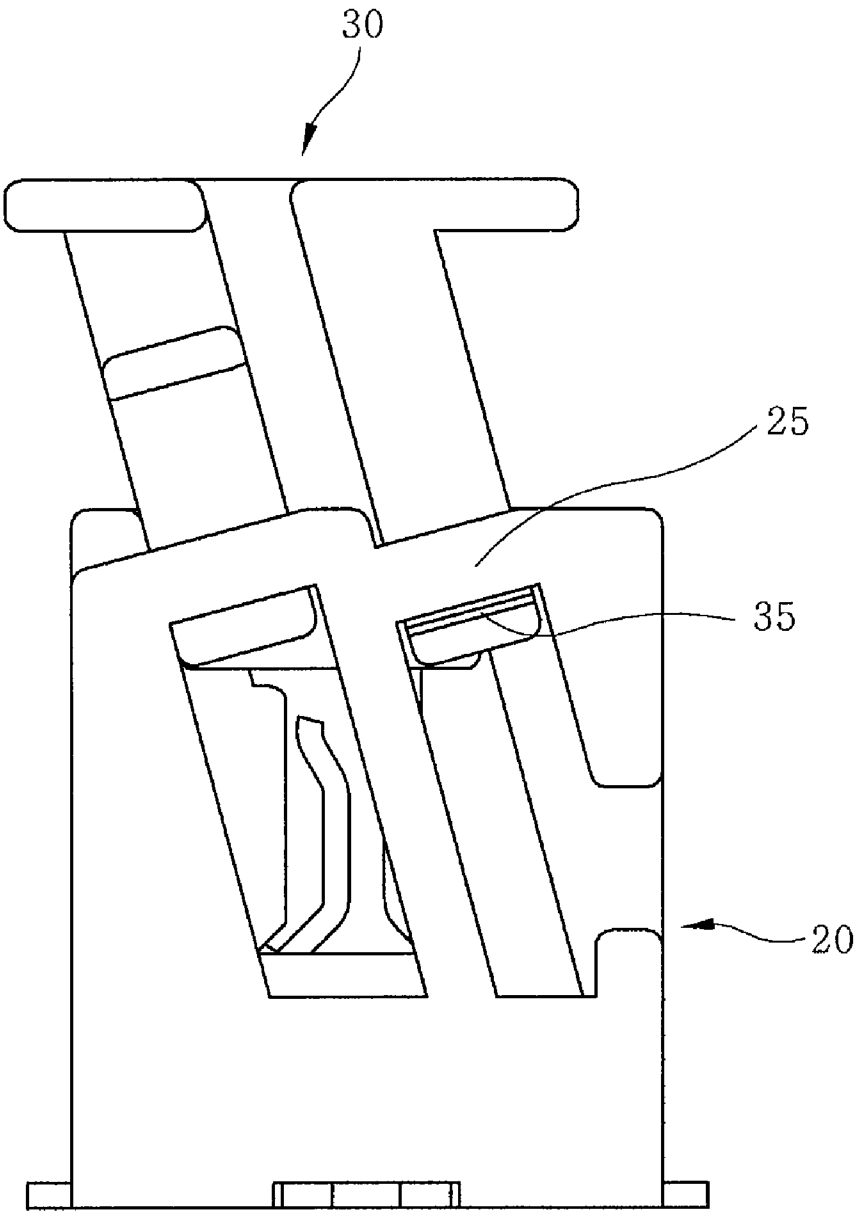
Figure 5B:
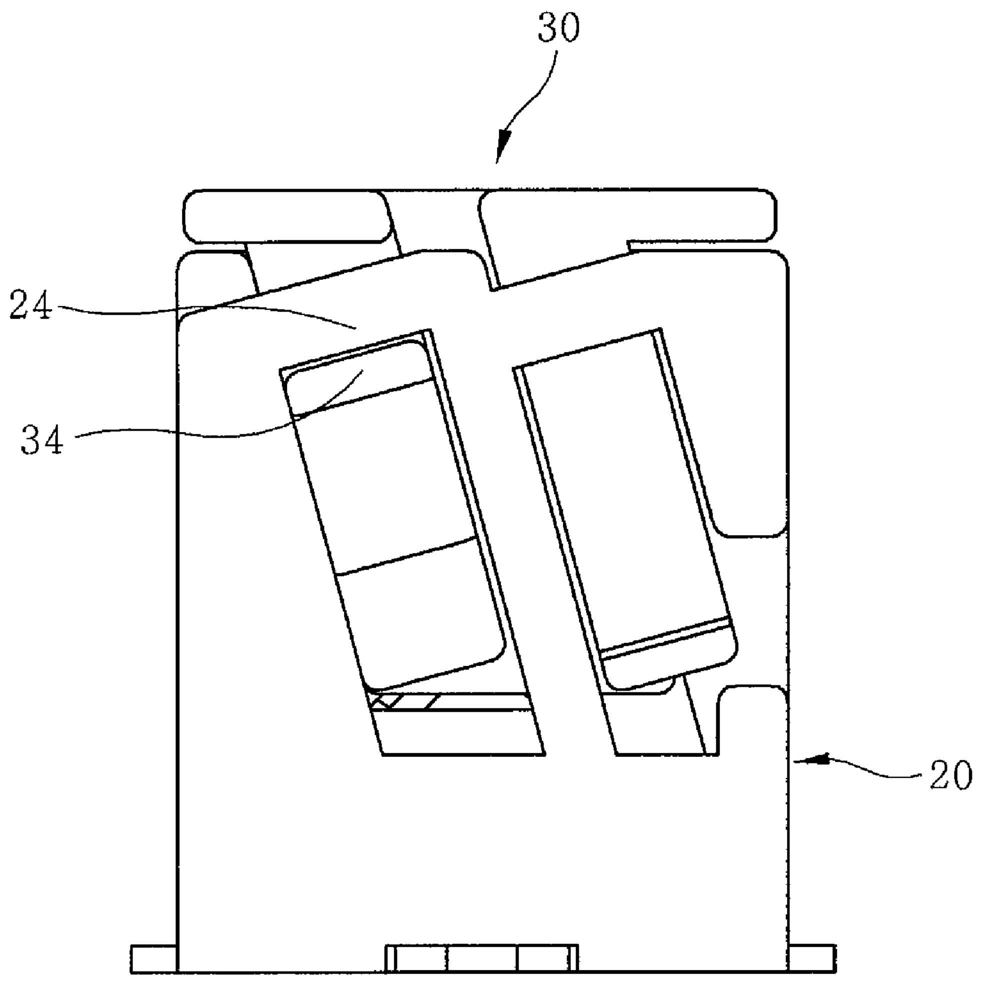
Figure 6:
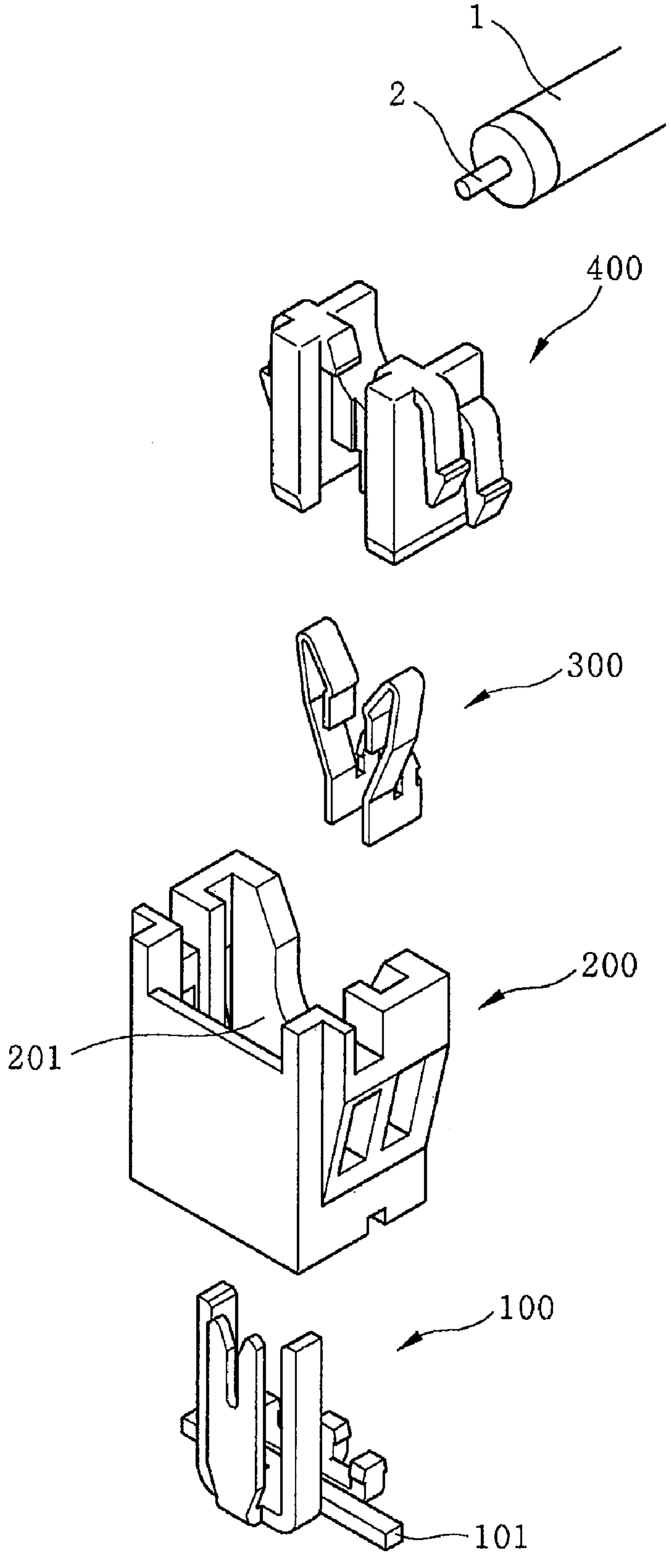
Fig.6 PRIOR ART

FIG. 3*a* is a schematic first side view of the backlight connector of FIG. 1 before a lamp is coupled to the backlight connector;

FIG. 3*b* is a schematic first side view of the backlight connector of FIG. 1 showing a cover of the backlight connector in a first position;

FIG. 3*c* is a schematic first side view of the backlight connector of FIG. 1 showing a cover of the backlight connector in a second position;

FIG. 4 is a perspective view of the backlight connector of FIG. 1 showing a locking protrusion and a separation preventing protrusion;

FIG. 5*a* is a left side view of the backlight connector of FIG. 1 showing the operation of the locking protrusion and the separation preventing protrusion when the cover is moved downward to a lowermost position;

FIG. 5*b* is a left side view of the backlight connector of FIG. 1 showing the operation of the locking protrusion and the separation preventing protrusion when the cover is moved upward to an uppermost position; and FIG. 6 is an exploded perspective view of a conventional backlight connector.

DETAILED DESCRIPTION OF THE EMBODIMENT(S)

Figure 2:
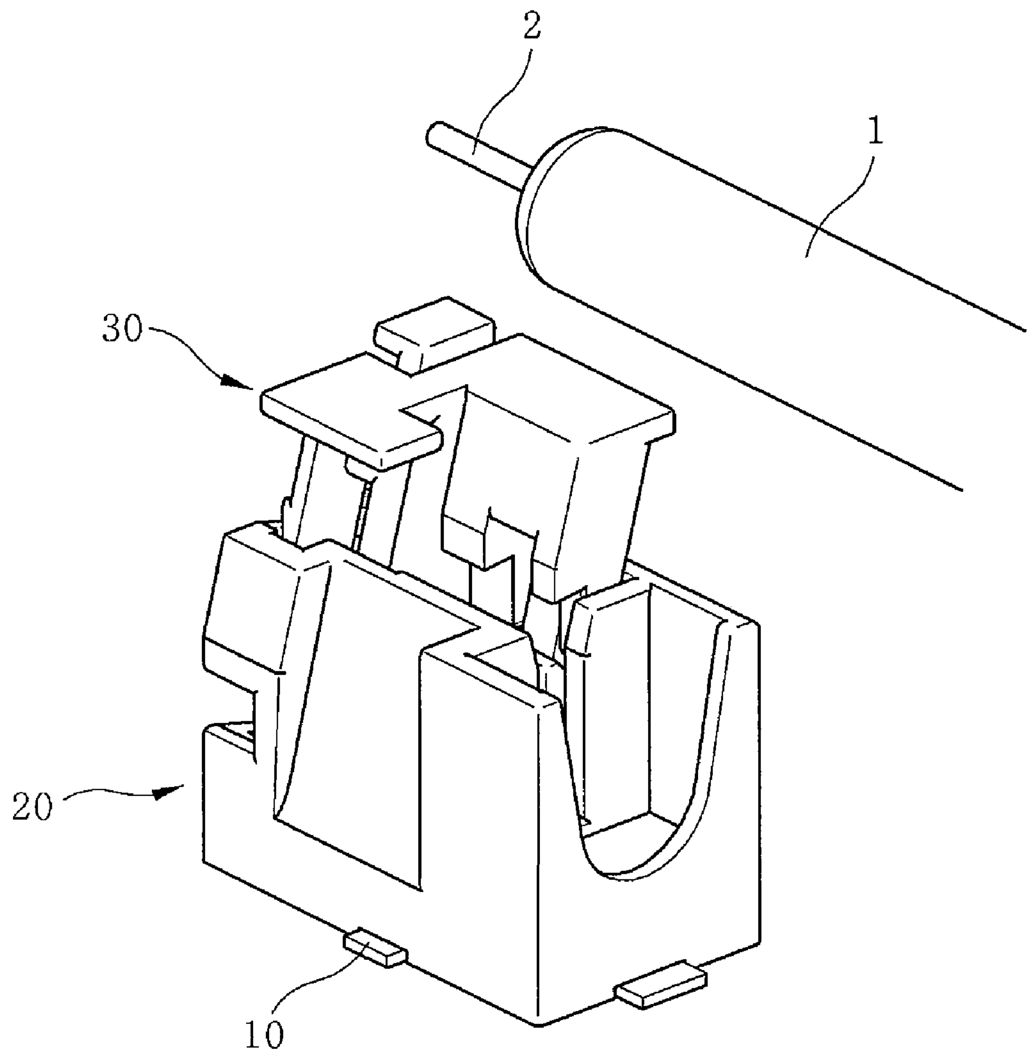
FIG. 2 is a partially exploded perspective view of the backlight connector of FIG. 1.

FIGS. 1-5 show a backlight connector according to an embodiment of the present invention. As shown in FIGS. 1-2, the backlight connector includes a terminal 10, a housing 20, a cover 30, and a backlight lamp 1 provided with a connection terminal 2. The backlight lamp 1 may be mounted, for example, on an LCD panel. The terminal 10 is configured to guide electric current supplied through a circuit board (not shown) to the backlight lamp 1. The terminal 10 may be made, for example, from an electrically conductive metal material. As shown in FIG. 1, a fixing member 11 is formed at a lower end of the terminal 10. The fixing member 11 is bent substantially parallel to the circuit board (not shown) so that the fixing member 11 may be fixed to the circuit board (not shown), for example, by soldering. An opposite end of the fixing member 11 is bent upward above the circuit board (not shown). A connection member 12 is formed at a substantial middle of the fixing member 11.

The connection member 12 is provided with a connection groove 121. The connection groove 121 has a width corresponding to a diameter of the connection terminal 2 of the backlight lamp 1 and electrically connects the backlight lamp 1 to the circuit board (not shown). The width of the connection groove 121 may be slightly less than the diameter of the connection terminal 2 of the backlight lamp 1 so that the connection terminal 2 is scratched when the connection terminal 2 is inserted into the connection groove 121. Thus, various kinds of foreign matter attached to an outer surface of the connection terminal 2 are removed from the outer surface of the connection terminal 2 when the outer surface of the connection terminal 2 is brought into contact with an inner surface of the connection groove 121. As a result, the electrical connection between the connection member 12 and the connection terminal 2 of the backlight lamp 1 is more effectively accomplished.

As shown in FIG. 1, the housing 20 serves to prevent the breakage of the terminal 10 and to stably support the backlight lamp 1. The housing 20 is provided at an inside thereof with a backlight lamp receiving opening 21, which is open in a region where the backlight lamp 1 is inserted and at a top of the housing 20. The connection member 12 of the terminal 10 is inserted into the housing 20 from a bottom of the housing 20 and is mounted in the backlight lamp receiving opening 21, and the fixing member 11 of the terminal 10 is exposed to an outside of the housing 20. A backlight lamp support groove 22 is formed proximate a bottom of the backlight lamp receiving opening 21 and is configured to contact a lower surface of the backlight lamp 1 at an end thereof. The backlight lamp support groove 22 corresponds to a shape of an outer surface of the backlight lamp 1 so that the backlight lamp 1 is supported in the housing 20 by the backlight lamp support groove 22. An inclined guide groove 23 is formed on a vertical inner surface of the backlight lamp receiving opening 21 and is configured to guide upward and downward movement of the cover 30 so that the cover 30 can be smoothly moved upward and downward in the housing 20. As shown in FIG. 4, the housing 20 is provided at one side thereof with a locking member 24 and at one side thereof with a separation preventing member 25.

As shown in FIG. 1, an outer surface of the cover 30 is provided with an inclined surface 31. The inclined surface 31 is configured for insertion in the guide groove 23 and has a width corresponding to the guide groove 23, while the inclined surface 31 is in contact with the guide groove 23. A terminal insertion member 32 is formed at one side of the cover 30 corresponding to a fixing direction of the backlight lamp 1. The terminal insertion member 32 extends substantially vertically and has an inclination corresponding to the inclined surface 31. Consequently, when the cover 30 is moved upward or downward, the terminal insertion member 32 opens or closes one side of the backlight lamp receiving opening 21 of the housing 20 in which the backlight lamp 1 is inserted. For example, when the cover 30 is moved upward, the terminal insertion member 32 opens one side of the backlight lamp receiving opening 21 to allow for smooth, easy insertion of the connection terminal 2 of the backlight lamp 1 into the inside of the housing 20.

As shown in FIG. 1, a pushing protrusion 33 is formed on a bottom side of the terminal insertion member 32 and is configured for forcibly inserting the connection terminal 2 of the backlight lamp 1 into the inside of the connection member 12. As the cover 30 is moved upward and downward, the pushing protrusion 33 is brought into contact with or separated from the connection terminal 2 of the backlight lamp 1. For example, when the backlight lamp 1 is inserted into the housing 20, the cover 30 is moved upward so that the pushing protrusion 33 is separated from the connection terminal 2 of the backlight lamp 1. When the cover 30 is moved downward into the housing 20, the pushing protrusion 33 is moved in an inclined fashion. As a result, the pushing protrusion 33 pushes a top of the connection terminal 2 of the backlight lamp 1 to forcibly insert the connection terminal 2 of the backlight lamp 1 into the inside of the connection member 12, whereby the electrical connection between the backlight lamp 1 and the terminal 10 is maintained. The cover 30 thereby prevents the separation of the backlight lamp 1 from the backlight connector.

A plurality of the pushing protrusions 33 may be formed at positions corresponding to the connection terminal 2 of the backlight lamp 1 such that the pushing protrusions 33 are spaced apart from each other. In this case, a force applied to the connection terminal 2 of the backlight lamp 1 by the pushing protrusions 33 is uniformly dispersed. Consequently, the connection terminal 2 of the backlight lamp 1 is prevented from being bent or damaged during the coupling of the connection terminal 2 to the backlight connector.

As shown in FIG. 4, the cover 30 is provided at one side thereof with a locking protrusion 34. The locking protrusion 34 is constructed so that a lower side of the locking protrusion 34 is fixed to one side of the cover 30, and an upper side of the locking protrusion 34 is substantially parallel with the outer surface of the cover 30. The locking protrusion 34 is gently inclined at the lower side thereof. The locking protrusion 34 is provided at the upper side thereof with a step part.

As shown in FIG. 4, the cover 30 is also provided at one side thereof with a separation preventing protrusion 35, which is spaced apart from the locking protrusion 34. The separation preventing protrusion 35 protrudes from the bottom of the cover 30 such that the separation preventing protrusion 35 is spaced apart from the separation preventing member 25 at a lowermost position of the cover 30, and the separation preventing protrusion 35 is locked by the separation preventing member 25 when the cover 30 is in an uppermost position.

A process for coupling the backlight lamp 1 to the backlight connector will now be described with reference to FIGS. 3*a*-3*c*. As shown in FIG. 3*a*, when the cover 30 is moved upward to the uppermost position, the inclined surface 31 of the cover 30 moves to the upper side and the outside of the housing 20 along the guide groove 23. As a result, the one side of the backlight lamp receiving opening 21, closed by the terminal insertion member 32, is opened. In this position, it is possible to smoothly insert the backlight lamp 1 and the connection terminal 2 of the backlight lamp 1 into the inside of the backlight connector. The backlight lamp 1 is arranged in the backlight lamp receiving opening 21 such that the backlight lamp 1 extends in a direction substantially perpendicular to a direction of movement of the cover 30.

Subsequently, as the cover 30 is pushed downward, as shown in FIG. 3*b*, the inclined surface 31 of the cover 30 moves downward along the guide groove 23 in an inclined fashion. As a result, the one side of the backlight lamp receiving opening 21 is closed by the terminal insertion member 32, and the pushing protrusion 33 is brought into contact with the top of the connection terminal 2 of the backlight lamp 1. When the cover 30 is pushed further downward, as shown in FIG. 3*c*, the pushing protrusion 33 forcibly inserts the connection terminal 2 of the backlight lamp 1 into the inside of the connection groove 121 formed by the connection member 12. As a result, the connection member 12 is brought into tight contact with the connection terminal 2 of the backlight lamp 1, and the electrical connection between the backlight lamp 1 and the backlight connector according to the present invention is accomplished.

As shown in FIG. 5*b*, when the cover 30 is completely inserted into the housing 20, the locking protrusion 34 of the cover is locked by the locking member 24 of the housing 20. As a result, separation of the cover 30 from the housing 20 is prevented while the backlight lamp 1 is coupled to the backlight connector. Poor connection between the backlight lamp 1 and the backlight connector and/or damage to the backlight lamp 1 is thereby effectively prevented.

Because the locking protrusion 34 is gently inclined at the lower side thereof, the locking protrusion 34 can be smoothly inserted into the inside of the locking member 24, when the cover 30 is moved downward. Also, because the locking protrusion 34 is provided at the upper side thereof with a step part, when the cover 30 is moved downward, the locking protrusion 34 is smoothly inserted into the inside of the locking member 24 by the gentle inclination of the locking protrusion 34. The step part of the locking protrusion 34 is then securely locked by the locking member 24.

Further, because the locking protrusion 34 is formed so that the lower end of the locking protrusion 34 is fixed to one side of the cover 30, and the upper part of the locking protrusion 34 is parallel with the outer surface of the cover 30, elastic deformation of the locking protrusion 34 is smoothly effected. Therefore, the locking operation between the locking protrusion 34 and the locking member 24 is smoothly carried out. When it is necessary to replace the backlight lamp 1 with a new one, the upper end of the locking protrusion 34 is moved toward the cover 30. As a result, the locking protrusion 34 is easily disengaged from the locking member 24 and the upward movement of the cover 30 from the housing 20 is easily and conveniently carried out.

In addition, the separation preventing member 25, by which the separation preventing protrusion 35 is locked when the cover 30 is in the uppermost position, prevents the cover 30 from being separated from the housing 20. Consequently, any separation between the housing 20 and the cover 30 is effectively prevented before the backlight lamp 1 is coupled to the backlight connector, and the operation of coupling the backlight lamp 1 to the backlight connector is more rapidly and smoothly carried out. Because the separation preventing protrusion 35 is locked by the separation preventing member 25 at the uppermost position of the cover 30, the separation preventing protrusion 35 does not affect the operation of the locking protrusion 34 and the locking member 24.

As is apparent from the above description, the backlight connector according to the present invention includes a minimum number of components, such as the connection terminal 2, the housing 20, and the cover 30, and is constructed in a structure in which the backlight lamp 1 is automatically coupled to the backlight connector through the upward and downward movement of the cover 30. Consequently, the present invention has the effect of more easily manufacturing the backlight connector and producing the backlight connector more simply, rapidly, and smoothly through an automated process during the manufacture of, for example, the LCD panel.

Also, the backlight lamp support groove 22 and the guide groove 23 are formed at the inside of the housing 20 for stably supporting the backlight lamp 1, and the cover 30 is smoothly moved at the inside of the housing 20 in an inclined fashion. Consequently, the present invention has the effect of preventing damage to the backlight lamp 1 coupled to the backlight connector and easily accomplishes the coupling and separation of the backlight lamp 1 to and/or from the backlight connector.

Further, the inclined member 31, the terminal insertion member 32, and the pushing protrusion 33 are formed at the cover 30 such that the backlight lamp 1 is easily inserted into the inside of the backlight connector, and the connection between the terminal 10 and the connection terminal 2 of the backlight lamp 1 is accomplished simultaneously with the downward movement of the cover 30, whereby the backlight lamp 1 is rapidly inserted into the backlight connector and is securely coupled to the backlight connector. Consequently, the present invention has the effect of more rapidly accomplishing the coupling of the backlight lamp 1 to the backlight connector. Also, the pushing protrusions 33 formed at the cover such that a force applied to the connection terminal 2 of the backlight lamp 1 by the pushing protrusions 33 is uniformly dispersed. Consequently, the present invention has the effect of preventing the connection terminal 2 of the backlight lamp 1 from being deformed or damaged during the coupling of the backlight lamp 1 to the backlight connector.

Additionally, the locking protrusion 34 and the locking member 24 are provided to prevent the separation of the cover 30 from the housing 20 after the backlight lamp 1 is completely coupled to the backlight connector. Consequently, the present invention has the effect of preventing the damage to the backlight lamp 1 due to the separation of the cover 30 from the housing 20 after the backlight lamp 1 is coupled to the backlight connector. Also, the locking protrusion 34 is formed at the outside of the cover 30 such that of the cover 30, locked to the housing 20, is easily separated from the housing 20, whereby the separation of the cover 30 from the housing 20 is easily and conveniently accomplished when the backlight lamp 1 is replaced with a new one. Consequently, the present invention has the effect of more conveniently repairing the LCD panel.

Furthermore, the separation preventing protrusion 35 and the separation preventing member 25 are provided to prevent the separation of the cover 30 from the housing 20 before the backlight lamp 1 is fixed to the backlight connector. Consequently, the present invention has the effect of solving the troublesomeness of the operation due to the separation of the cover 30 from the housing 20 and more rapidly and smoothly performing the backlight lamp 1 coupling operation through an automated process.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A backlight connector, comprising:

a housing having a backlight lamp receiving opening with an inclined guide groove;

a cover having a terminal insertion member and an inclined surface corresponding to the inclined guide groove, the inclined surface and the terminal insertion member extending into the backlight lamp receiving opening when the cover is moved from an uppermost position to a lowermost position along the inclined guide groove.

2. The backlight connector of claim 1, wherein the housing includes a backlight lamp support groove.

3. The backlight connector of claim 1, wherein the cover includes a locking protrusion and the housing includes a locking member, the locking protrusion and the locking member engaging when the cover is in the lowermost position to secure the cover in the lowermost position.

4. The backlight connector of claim 3, wherein the cover includes a separation preventing protrusion and the housing includes a separation preventing member, the separation preventing member and the separation preventing protrusion engaging when the cover is in the uppermost position to prevent the cover from disengaging from the housing.

5. The backlight connector of claim 1, wherein at least one pushing protrusion is formed on the terminal insertion member.

6. The backlight connector of claim 5, further comprising a terminal arranged in the housing, the terminal having a connection member extending into the backlight lamp receiving opening and a fixing member arranged outside of the housing.

7. The backlight connector of claim 6, wherein the pushing protrusion is arranged adjacent to the terminal insertion member when the cover is in the lowermost position.

8. The backlight connector of claim 7, wherein the terminal insertion member opens toward the cover.

9. The backlight connector of claim 5, further comprising a backlight lamp, the backlight lamp being arranged in the backlight lamp receiving opening such that the backlight lamp extends in a direction substantially perpendicular to a direction of movement of the cover.

10. The backlight connector of claim 9, wherein the backlight lamp includes a connection terminal, the connection terminal being engaged by the pushing protrusion when the cover is in the lowermost position.

11. The backlight connector of claim 10, wherein the backlight lamp is secured to the housing by the cover when the cover is in the lowermost position.

12. The backlight connector of claim 10, further comprising a terminal arranged in the housing, the terminal having a connection member extending into the backlight lamp receiving opening, the connection member being electrically connected to the connection terminal.

13. The backlight connector of claim 12, wherein the terminal has a fixing member arranged outside of the housing.

* * * * *